US009558867B2

(12) United States Patent
Gu

(10) Patent No.: US 9,558,867 B2
(45) Date of Patent: Jan. 31, 2017

(54) FLAME RETARDANT THERMOPLASTIC ELASTOMERS

(75) Inventor: Jiren Gu, Naperville, IL (US)

(73) Assignee: PolyOne Corporation, Avon Lake, OH (US)

( * ) Notice: Subject to any disclaimer, the term of this patent is extended or adjusted under 35 U.S.C. 154(b) by 1141 days.

(21) Appl. No.: 13/265,586

(22) PCT Filed: Apr. 27, 2010

(86) PCT No.: PCT/US2010/032485

§ 371 (c)(1),
(2), (4) Date: Oct. 21, 2011

(87) PCT Pub. No.: WO2010/126855

PCT Pub. Date: Nov. 4, 2010

(65) Prior Publication Data

US 2012/0037396 A1 Feb. 16, 2012

Related U.S. Application Data

(60) Provisional application No. 61/173,668, filed on Apr. 29, 2009.

(51) Int. Cl.

| | |
|---|---|
| ***H01B 7/295*** | (2006.01) |
| ***C08K 5/52*** | (2006.01) |
| ***C08L 71/12*** | (2006.01) |
| *C08K 5/00* | (2006.01) |
| *C08K 5/49* | (2006.01) |
| *C08L 23/10* | (2006.01) |
| *C08L 53/02* | (2006.01) |

(52) U.S. Cl.

CPC ............... *H01B 7/295* (2013.01); *C08L 71/12* (2013.01); *C08K 5/0083* (2013.01); *C08K 5/49* (2013.01); *C08L 23/10* (2013.01); *C08L 53/025* (2013.01)

(58) Field of Classification Search

CPC ........... C08L 23/10; C08L 23/16; C08L 23/12; C08L 23/14; C08L 25/04; C08L 25/16; C08L 71/00; C08L 71/12; C08L 53/00; C08L 53/005; C08L 53/02; C08L 53/025; C08L 2201/02; C08L 2203/202; C08L 2205/03; C08L 2666/40; C08L 2666/42; C08L 2666/84; C08L 2666/24; C08L 5/0083; C08K 3/0058; C08K 3/0083; H01B 7/00; H01B 7/29; H01B 7/295; H08B 3/00; H08B 3/44; H08B 3/441; H08B 3/442

USPC ..... 428/375, 379, 383; 174/110 AR, 110 SY, 174/110 PM

See application file for complete search history.

(56) References Cited

U.S. PATENT DOCUMENTS 4,959,412 A * 9/1990 Arter et al. .................... 525/98
5,455,292 A * 10/1995 Kakegawa et al. ........... 524/141
5,705,556 A * 1/1998 Djiauw et al. ................ 524/505
5,807,915 A * 9/1998 Chu et al. ..................... 524/270
5,910,526 A * 6/1999 Chu et al. ..................... 524/270
5,965,251 A * 10/1999 Namura et al. ............ 428/318.4
6,255,371 B1 7/2001 Schlosser et al.
6,503,993 B1 * 1/2003 Huovinen et al. ......... 526/348.1
6,576,700 B2 * 6/2003 Patel ............................ 524/508
6,838,503 B2 1/2005 Yin et al.
7,005,465 B2 2/2006 Sato
7,504,585 B2 * 3/2009 Harada et al. ............ 174/110 R
7,589,281 B2 * 9/2009 Qiu et al. .................. 174/110 R
7,622,522 B2 11/2009 Qiu et al.
7,655,714 B2 2/2010 Qiu et al.
7,678,852 B2 * 3/2010 Kaprinidis .................... 524/100
7,776,441 B2 * 8/2010 Mhetar et al. ................ 428/379
8,278,376 B2 * 10/2012 Qiu et al. ..................... 524/126
8,563,131 B2 * 10/2013 Mhetar et al. ................ 428/379
2002/0151652 A1 * 10/2002 Adedeji ....................... 525/133
2003/0082362 A1 * 5/2003 Khandpur et al. ......... 428/304.4
2005/0075472 A1 4/2005 Yeager et al.
2005/0197447 A1 * 9/2005 Gu et al. ...................... 524/505
2005/0197464 A1 * 9/2005 Handlin et al. ............... 525/314
2006/0131050 A1 6/2006 Mhetar et al.
2006/0131052 A1 6/2006 Mhetar et al.
2006/0131059 A1 6/2006 Xu et al.
2006/0135661 A1 * 6/2006 Mhetar et al. ................ 524/127
2006/0278425 A1 * 12/2006 Harada et al. ............ 174/110 R
2008/0193755 A1 * 8/2008 Guise et al. .................. 428/379
2008/0206468 A1 8/2008 Klei et al.
2008/0251271 A1 10/2008 Jeyakumar et al.
2009/0069487 A1 * 3/2009 Gu et al. ...................... 524/505
2009/0084577 A1 * 4/2009 Qiu et al. .................. 174/120 C
2009/0093584 A1 4/2009 Gelles et al.
2009/0176091 A1 7/2009 Karayianni et al.
2010/0012373 A1 * 1/2010 Guo et al. ................... 174/72 A
2012/0037396 A1 * 2/2012 Gu ......................... 174/110 AR
2012/0100371 A1 * 4/2012 Araki et al. .................. 428/375
2013/0280532 A1 * 10/2013 Balfour et al. ............... 428/375
2014/0094538 A1 * 4/2014 Kim ............................. 523/122
2014/0133812 A1 * 5/2014 Kimura et al. ............... 385/100

FOREIGN PATENT DOCUMENTS

JP 11199716 A 7/1999
JP 2010118207 A * 5/2010
NL EP 1883081 A1 * 1/2008 .......... C08K 5/0066
WO WO 9924479 * 5/1999
WO WO2004011504 A 2/2004
WO WO2006065519 A 6/2006
WO WO 2009042369 A2 * 4/2009
WO WO 2010119871 A1 * 10/2010

OTHER PUBLICATIONS

JLS-APP MSDA; Mar. 2009.*

* cited by examiner

*Primary Examiner* — Jeremy R Pierce
(74) *Attorney, Agent, or Firm* — Michael J. Sambrook; John H. Hornickel

(57) ABSTRACT

A flame-retardant thermoplastic elastomer compound is disclosed having polyphenylene ether, a hydrogenated styrene block copolymer, at least one solid non-halogenated phosphorus containing flame retardant, and a nucleated olefinic polymer. The compound has a before-aging tensile elongation of >200% and an after-aging tensile elongation residual of at least 75%, according to the UL 62 test, which makes it useful as an insulation layer, a jacketing layer, or both for protected electrical lines such as alternating current wire and cable products, accessory cables, and variety of injection molded electrical or electronic parts.

12 Claims, No Drawings

FLAME RETARDANT THERMOPLASTIC ELASTOMERS

CLAIM OF PRIORITY

This application claims priority from U.S. Provisional Patent Application Ser. No. 61/173,668 filed on Apr. 29, 2009, which is incorporated by reference.

FIELD OF THE INVENTION

This invention relates to thermoplastic elastomers, polymer compounds which exhibit elasticity while remaining thermoplastic, which are flame retardant and contain polyphenylene ether.

BACKGROUND OF THE INVENTION

The world of polymers has progressed rapidly to transform material science from wood and metals of the $19^{th}$ Century to the use of thermoset polymers of the mid-$20^{th}$ Century to the use of thermoplastic polymers of later $20^{th}$ Century.

Thermoplastic elastomers (TPEs) combine the benefits of elastomeric properties of thermoset polymers, such as vulcanized rubber, with the processing properties of thermoplastic polymers.

Thermoplastic elastomers presently are prepared from fossil-fuel derived polymer resins, such as styrene block copolymers (SBCs), thermoplastic vulcanizates (TPV), thermoplastic olefins (TPO), copolyesters (COPE), thermoplastic urethanes (TPU), copolyamide (COPA), and most recently olefin block copolymers (OBCs).

Recently thermoplastic elastomers have included polyphenylene ether (PPE). Two examples are found in U.S. Pat. No. 6,838,503 (Yin et al.) and U.S. Pat. No. 7,005,465 (Sato). But the formulations disclosed in these two patents apparently do not have sufficient elongation to satisfy Underwriters' Laboratory Test 62 (UL 62), which requires, among other things, more than 200% tensile elongation before aging and retention of more than 75% of that tensile elongation after aging at 121° C. for 168 hours or preferably at 136° C. for 168 hours.

SUMMARY OF THE INVENTION

The art needs a TPE made from PPE that passes the entire requirements of the UL 62 test, especially with respect to tensile elongation (a) before and (b) after undergoing thermal aging as described above, (c) a wire and cable deformation of less than 50% after undergoing weighted, thermal aging at 150° C. for one hour, and (d) the VW-1 vertical cable burn.

The present invention has found a unique combination of ingredients to make a non-halogen, non-red phosphorous flame retardant TPE containing PPE which passes all parts of the UL 62 test.

Significantly, the flame retardant can be non-halogen and still satisfy all parts of the UL 62 test. It has been found that the thermoplastic elastomer of the present invention can be flexible, stretchy, flame retardant without halogens or red phosphorus, and soft.

Even more specifically, the non-halogenated flame retardant can be solid particles which are not sensitive to water, which is important for underwater resistivity of plastic articles made from the TPE and provide long term flame retardant properties and continued good mechanical properties in the presence of water or high humidity. Also, solid particle flame retardants used for this invention have no negative effect on the elasticity of the TPE.

The TPEs of the present invention have a good surface appearance, can be made at high extrusion speeds comparable to what is used for polyvinyl chloride (PVC) wire and cable insulation and jacketing (even using the same screw design as used for PVC production), and can pass the even more stringent European Union 70° C./48 hr underwater insulation resistance requirement. The TPEs also have excellent underwater thermal aging which requires endurance after underwater exposure to 70° C. for 168 hours.

The present invention solves the problem of finding a commercially practical non-halogenated flame retardant TPE made from PPE which is flexible, durable, and has a before-aging tensile elongation of >200% and an after-aging tensile elongation residual of more than 75%, passes 150° C. deformation test and VW-1 flame test among other testing requirements according to the UL 62 test. This new TPE passes the tests sufficient to be useful as insulation, jacketing, or both for wire and cable, including especially alternating current (AC) wire and cable insulation and jacketing.

"Wire and cable" is an industry term for a line of axial length which conducts electricity or other electromagnetic signals and is protected by electric insulation layers, jacketing layers, or both. Therefore, whether in the form of wire or in the form of cable, the term "protected electrical line" will be used to denote either or both.

One aspect of the invention is a thermoplastic elastomer compound, comprising from about 10 to about 60 weight percent of a polyphenylene ether; from about 10 to about 60 weight percent of a hydrogenated styrenic block copolymer; from about 5 to about 30 weight percent of at least one solid non-halogen flame retardant selected from the group consisting of organo-phosphinate, melamine polyphosphate, and combinations thereof; and from about 5 to about 40 weight percent of a nucleated olefinic polymer; wherein the compound has a before-aging tensile elongation of >200% and an after-aging tensile elongation residual of at least 75%, according to the Underwriters' Laboratory test UL 62 test.

Another aspect of the invention is a plastic article molded or extruded from the TPE of the present invention.

Another aspect of the invention is a protected electrical line, comprising (a) wire or cable having an axial length and (b) at least one layer of the TPE of the present invention enveloping at least a portion of the axial length of the wire or cable.

Features of the invention will become apparent with reference to the following embodiments.

EMBODIMENTS OF THE INVENTION

Polyphenylene Ether

PPE, also known as poly(2,6-dimethylphenol), is a well known thermoplastic resin marketed commercially by a variety of companies.

As explained by Yin et al., non-limiting examples of types of PPE can include poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dimethoxy-1,4-phenylene ether), poly(2,6-di(chloro methyl)-1,4-phenylene ether), poly(2,6-di(bromo methyl)-1,4-phenylene ether), poly(2,6-diphenyl-1,4-phenylene ether), poly(2,6-ditoluoyl-1,4-phenylene ether), poly(2,6-dichloro-1,4-phenylene ether), poly(2,6-dibenzyl-1,4-phenylene ether), poly (2,5-dimethyl-1,4-phenylene ether), and combinations thereof.

Commercial PPE resins are often a blend of polyphenylene ether with an aromatic vinyl group thermoplastic resin.

Also as explained by Yin et al., non-limiting examples of the aromatic vinyl group thermoplastic resin can include homopolymers of styrene or its derivatives, as well as copolymers of styrene and p-methyl styrene, alpha-methyl styrene, alpha-methyl-p-methyl styrene, chlorostyrene, bromostyrene, etc. The rubber-modified polystyrene (HIPS) formed from 70 to 99% by weight of aromatic vinyl compound mentioned above and 1 to 30% by weight of diene rubber, can also be used. Examples of the diene rubber used in HIPS include homopolymers of conjugated diene group compounds such as butadiene, isoprene, chloroprene, etc.; copolymers of conjugated diene group compounds and unsaturated nitro compounds or aromatic vinyl compounds; as well as natural rubber, etc. These can be used in the form of one type or in the form of mixture of two or more than two types. Poly butadiene-butadiene-styrene copolymer is often preferred. HIPS can be obtained by methods such as emulsification polymerization, suspension polymerization, lump state polymerization, solution polymerization, or by combining these methods. Additional examples of aromatic vinyl group resins include styrene-acrylonitrile-acrylate copolymer, FPDM group rubber-modified polystyrene, acrylate rubber-modified styrene-acrylonitrile copolymer and others.

Virtually any commercial PPE is a candidate for use in this invention, over a wide range of molecular weights. Of the various commercially available PPEs, two are already known to be useful. One is BLENDEX 820 brand PPE resin sold by Chemtura and is not a blend of PPE with another polymer. The other is BLUESTAR brand PPE resin sold by Bluestar of Yuncheng, China. It also is not a blend.

Thermoplastic Elastomer

Because PPE is generally brittle or at least more brittle than can be tolerated for wire and cable uses, a thermoplastic elastomer is needed to add flexibility to the PPE.

Any commercial thermoplastic elastomer fundamentally is a candidate for use to render the PPE more flexible. Styrene block copolymers (SBC) as a class are acceptable for making the TPE more flexible. Preferably, a highly hydrogenated SBC is used. Non-limiting examples of highly hydrogenated SBCs include styrene-ethylene butylene-styrene polymers, styrene-ethylene propylene-styrene polymers, hydrogenated styrene-isoprene block copolymers, and hydrogenated styrene-butadiene block copolymers, and combinations of them.

The preferred thermoplastic elastomer is a styrenic block copolymer, more preferably one which is hydrogenated such as styrene-ethylene-butylene-styrene (SEBS) or styrene-ethylene-ethylene-propylene-styrene (SEEPS) in a variety of grades.

There are two types of thermoplastic elastomers useful for this invention: those which require the presence of plasticizing oil and those which do not.

The first type of hydrogenated TPE which requires plasticizing oil should have a weight average molecular weight of between about 70,000 and about 160,000 with a preferred molecular weight of about 100,000. The ratio of styrenic end-block to olefinic mid-block should range from about 20/80 to about 40/60, and preferably about 30/70.

The second type of hydrogenated TPE which does not require plasticizing oil should have a weight average molecular weight of less than about 230,000 and styrenic end-block content of less than about 22%. Also, the mid-block can have a relatively higher vinyl content than typical SEBS TPEs.

Hydrogenated styrene block copolymers are commercially available from a number of sources, preferably the KRATON G brand series from Kraton Polymers. Of the various G grades, KRATON G1642, KRATON G1643 (for non-oil formulations), KRATON G1650, KRATON G1652, and KRATON G1654H are desirable. Also KRATON MD6945 SEBS (for non-oil formulations) is useful. Also SEPTON 4033 SEEPS, which has a similar molecular weight and size of styrenic end-blocks as KRATON G1650, and KURARAY Q1250, a proprietary block copolymer with a different endblock than styrene, can be used.

Solid Non-Halogenated Flame Retardant

The TPE for use as wire and cable insulation or jacketing or both must be flame retardant to satisfy building requirements and codes for mammalian-occupied spaces.

The marketplace in recent years has preferred to use non-halogenated flame retardants because in a fire such flame retardants do not release chlorine-containing compounds or bromine-containing compounds.

One type of non-halogenated flame retardant is red phosphorus or chemicals containing red phosphorus. This type is also currently discouraged in the market and in building requirements and codes.

Therefore, to avoid both halogenated flame retardants and red phosphorus, the TPEs of the present invention employ either organo-phosphinates or melamine polyphosphates or both. These two types of flame retardants are solid particles which are particularly suitable for use in the TPE compounds of the present invention because they are far less likely to migrate within the compound after it has been finally formed into a plastic article such as a sleeve of insulation or jacketing for a wire or a cable. Also as explained above, these two types of solid non-halogenated flame retardants contribute to underwater resistivity, durability in high humidity conditions, etc.

Organo-phosphinate is commercially available as a proprietary compound from Clariant Corporation marketed under the brands EXOLIT OP 930, EXOLIT OP 935, EXOLIT OP 1311, EXOLIT OP 1312, and EXOLIT OP 1230.

These organo-phosphinates are also useful as synergists for other flame retardant materials, such as melamine polyphosphate or polyammonium polyphosphate or proprietary equivalent performers such as AMFINE FP-2100J flame retardant from Amfine Chemical Corporation. Each of these latter flame retardant materials alone is not very effective at low concentration in the TPE formulation, but a blend of the organo-phosphinate in a small amount with any of them is very effective for flame retardancy even if the total concentration of flame retardants remains minor.

It is believed that a combination of organo-phosphinate and melamine polyphosphate offers the best performance at reasonable cost. in wire and cable insulation or jacketing when striving to pass the underwater thermal aging test and underwater insulation resistance test because neither of the chemicals is overtly sensitive to water.

Melamine polyphosphate is commercially available both from Hangzhou JLS Flame Retardants Chemicals Co., Hangzhou Zhejiang, China as JLS-PNA and JLS-PNB brand flame retardant additives and from Ciba Specialty Chemicals as MELASPUR 200 brand flame retardant additive.

Flame retardants of polyammonium polyphosphate (APP) or a blend including polyammonium polyphosphate are commercially available both from Hangzhou JLS Flame Retardants Chemicals Co. as APP, PNP1C, and PNP1D brand flame retardant additives and from Clariant as EXOLIT AP422, EXOLIT AP 462, EXOLIT AP760, and EXOLIT AP766 brand flame retardant additives. Another major APP supplier is Budenheim of Germany. AMFINE FP-2100J and FP-2200 are brands of proprietary nitrogen-phosphorous based flame retardant products from Amfine Chemical Corporation.

One of the disadvantages of the TPE compounds disclosed by Yin et al. and Sato is that their compound apparently does not have a tensile elongation before aging of more than 200% and did not report performance of 150° C. heat deformation or tensile elongation retention after thermal aging, these properties being required by the UL 62 safety standard. While not limited to a particular theory, it is believed that the use by Yin et al. and Sato of liquid non-halogenated flame retardant(s) is at least a contributing factor to the failure to have a tensile elongation before aging of more than 200%.

Nucleated Olefinic Polymer

The TPE of the present invention benefits from an amount of nucleated olefinic polymer, preferably a nucleated polypropylene homopolymer, to assist in processing of the TPE into its final shape and to contribute to the 150° C. heat deformation heat resistance of the plastic article made from the TPE. Any commercially available nucleated olefinic polymer is a candidate for use in the TPE. A commercial example of a nucleated polypropylene homopolymer is FORMOLENE 5144L brand polypropylene from *Formosa* Plastics. A second example is a nucleated homo-polypropylene identified as PP1043N (5 Melt Flow Index) from ExxonMobil.

Tackifier

A tackifier, also known as a midblock SBC modifier, is also used in the TPE. Any commercially available tackifier is a candidate for use in the TPE. Non-limiting examples of tackifiers include Escorez ESCOREZ 5000 series tackifiers, such as Grades 5340 and 5320 from ExxonMobil Chemicals; REGALITE R1125, REGALITE R1100, REGALREZ 1139, REGALREZ 1126, REGALREZ 1094, PLASTOLYN R1140, EASTOTAC H 140-W, and EASTOTAC H125-W tackifiers from Eastman Chemicals; and ARKON P100, ARKON P115, ARKON P125, and ARKON P140A tackifiers from Arakawa Chemicals. Presently preferred as a tackifier is PLASTOLYN R1140 tackifier from Eastman Chemicals.

Optional Oil

As stated above, depending on the type of hydrogenated styrenic block copolymer used, plasticizing oil may be necessary to improve flow and flexibility of the resulting TPE. Any oil conventionally used to plasticize a SBC is a candidate for use, such as mineral oil, vegetable oil, synthetic oil, etc. A presently preferred oil is DRAKEOIL 600 brand oil from Drake Oil Co. of Syracuse, N.Y., USA.

Optional Additives

The thermoplastic elastomer compounds of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; antioxidants; biocides (antibacterials, fungicides, and mildewcides), anti-fogging agents; anti-static agents; bonding, blowing and foaming agents; dispersants; fillers and extenders; smoke suppresants; expandable char formers; impact modifiers; initiators; lubricants; micas; pigments, colorants and dyes; oils and plasticizers; processing aids; other polymers; release agents; silanes, titanates and zirconates; slip and anti-blocking agents; stabilizers; stearates; tackifiers; ultraviolet light absorbers; viscosity regulators; waxes; and combinations of them.

Table 1a, for SBC which requires plasticizing oil, shows the acceptable, desirable, and preferable ranges of ingredients for the thermoplastic elastomer compound of the present invention, (so long as the particular combination results in a TPE which has an elongation of more than 200%). Table 1b, for SBC which does not require plasticizing oil, shows those same three ranges for the thermoplastic elastomer compound.

TABLE 1a

| Ranges of Ingredients | | | |
|---|---|---|---|
| Ingredient (Wt. Percent) | Acceptable | Desirable | Preferable |
| Polyphenylene Ether (blended or unblended) | 10-50 | 15-40 | 20-35 |
| Hydrogenated Styrenic Block Copolymer (requiring oil) | 10-50 | 15-45 | 20-40 |
| Solid, Non-Halogenated Flame Retardant | 5-30 | 5-25 | 10-20 |
| Nucleated Olefinic Polymer | 5-30 | 5-25 | 5-20 |
| Oil | 5-30 | 5-25 | 5-20 |
| Tackifier | 5-25 | 5-20 | 5-15 |
| Other Additives | 0-5 | 0.5-2 | 0.7-1.5 |

TABLE 1b

| Ranges of Ingredients | | | |
|---|---|---|---|
| Ingredient (Wt. Percent) | Acceptable | Desirable | Preferable |
| Polyphenylene Ether (blended or unblended) | 10-60 | 15-50 | 20-50 |
| Hydrogenated Styrenic Block Copolymer (not requiring oil) | 20-60 | 25-55 | 30-50 |
| Solid, Non-Halogenated Flame Retardant | 5-30 | 5-25 | 10-20 |
| Nucleated Olefinic Polymer | 5-40 | 5-35 | 10-30 |
| Optional Oil | 0-10 | 0-7 | 0-5 |
| Tackifier | 0-20 | 0-10 | 0-5 |
| Other Additives | 0-5 | 0.5-2 | 0.7-1.5 |

Processing

The preparation of compounds of the present invention is uncomplicated once the proper ingredients have been selected. The compound of the present can be made in batch or continuous operations.

Mixing in a continuous process typically occurs in an extruder that is elevated to a temperature that is sufficient to melt the polymer matrix with addition of all additives at thefeed-throat, or by injection or side-feeders downstream.

Extruder speeds can range from about 300 to about 700 revolutions per minute (rpm), and preferably from about 500 rpm. Typically, the output from the extruder is pelletized for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

Usefulness of the Invention

Any plastic article needing flexibility, elongation, flame retardance, and the physical properties of PPE can benefit from TPEs of the present invention. Preferably, any plastic article which employs flexible polyvinyl chloride compounds can now be served by TPEs of the present invention.

As seen in the examples below, the TPEs can be especially useful as insulation or jacketing layers or both used with protected electrical line (wire or cable or both) which requires flame retardant properties and sufficient physical properties to pass the UL 62 safety standard. Electrical power wires and cables fit this category.

Alternatively, because it has been found that TPE compounds of the present invention also pass the VW-1 and V-0 flame tests, they are also suitable as insulation or jacketing layers for accessory wire or accessory cable that need not meet all parts of the UL 62 safety standard.

Moreover, other plastic articles which need strong physical properties arising from PPE and non-halogenated flame retardance can benefit from TPE compounds of this invention. Such plastic articles are typically injection molded into precise electrical or electronic parts, such as connectors, junction boxes, etc.

EXAMPLES

Table 2 shows sources of ingredients for the examples.

TABLE 2

| Chemical | Brand | Source |
|---|---|---|
| Styrene-ethylene-butylene-styrene hydrogenated thermoplastic elastomer | KRATON G1650 | Kraton Polymers |
| Styrene-ethylene-butylene-styrene hydrogenated thermoplastic elastomer | KRATON G1652 | Kraton Polymers |
| Styrene-ethylene-butylene-styrene hydrogenated thermoplastic elastomer | KRATON G1642 | Kraton Polymers |
| Styrene ethylene-ethylene-propylene styrene hydrogenated thermoplastic elastomer | SEPTON 4033 | Kuraray |
| Proprietary high temperature performance hydrogenated block copolymer | KURARAY Q1250 | Kuraray |
| Styrene-ethylene-butylene-styrene hydrogenated thermoplastic elastomer | KRATON G1654H | Kraton Polymers |
| Styrene-ethylene-butylene-styrene hydrogenated thermoplastic elastomer with high vinyl content. | KRATON G1643 | Kraton Polymers |

TABLE 2-continued

| Chemical | Brand | Source |
|---|---|---|
| Styrene-ethylene-butylene-styrene hydrogenated thermoplastic elastomer with high vinyl content. | KRATON MD6945 | Kraton Polymers |
| White mineral oil | DRAKEOL 600 | Drake Oil Co. |
| Polyphenylene Ether resin | BLENDEX HPP820 | Chemtura |
| Nucleated polypropylene process aid | FORMOLENE 5144L | Formosa Plastics |
| Tackifier (SEBS Midblock Modifier) | PLASTOLYN R1140 | Eastman Chemicals |
| Pigment | Black CPH-294 | Polymer Partner, Henderson, KY |
| Organophosphinate flame retardant | EXOLIT OP 935 | Clariant |
| Melamine-polyphosphate flame retardant | JLS-PNA | Hangzhou JLS Flame Retardants Chemicals Co. (China) |
| Polyammonium polyphosphate | JLS-APP | Hangzhou JLS Flame Retardants Chemicals Co. (China) |
| Proprietary nitrogen-phosphorous based flame retardant | FP-2100J | Amfine (Upper Saddle River, NJ, USA) |
| Antioxidant | IRGANOX 1010 | Ciba |
| Antioxidant | IRGAFOS 168 | Ciba |
| Antioxidant | NAUGARD 445 | Chemtura |
| Antioxidant | IRGANOX MD 1024 | Ciba |
| Fluoropolymer Process Aid | DYNAMAR FT 5911 | Dyneon (3M Company) |

All Examples and Comparison Examples were made via a two-pass extrusion process because the solid flame retardant is overly sensitive at or above the glass transition temperature ($T_g$) of PPE. (In commercial production using a high length/diameter ratio extruder, a single pass process is feasible with downstream addition of the solid flame retardant(s) in a zone of lower temperature.)

In the first pass, all ingredients except the flame retardant(s) were fed into the throat of a Leistritz twin screw extruder, having a downstream volatiles evacuation port operating under minor negative pressure, to make pellets. The extruder operated at a mixing speed of 500 rpm and a barrel temperature of about 248° C. with a 1 mm die and pelletizer to form pellets. During extrusion, a minor amount of water was introduced into a side port upstream from the volatiles extrusion port to assist processing. The pellets are returned to throat of the extruder and the solid flame retardant(s) are added at the throat to commence the second pass of compounding. The extruder operated at a mixing speed of 500 rpm and a barrel temperature of about 199° C. with a 1 mm die and pelletizer to form pellets.

Depending on the test needed, the pellets were molded into plaques, extruded into film, or extruded into wire and cable insulation or jacketing layers.

To make test film, a Brabender extruder having and a 15.24 cm extrusion die and operating at mixing speed of 100 rpm and 215° C. barrel temperature was then used to make film of 0.38-0.51 mm nominal thickness for physical property testing except for Shore A hardness. To test for hardness, pellets were injection molded into a 3.0 mm test plaque.

Table 3 shows the formulations of Examples 1-5, internal tests made into film for initial screening for UL-62 testing and other physical testing.

TABLE 3

| Ingredient (Wt. %) | 1 | 2 | 3 | 4 | 5 |
|---|---|---|---|---|---|
| Kraton G1650 (100,000 Mw) | 25.26 | 24.58 | 23.4 | 23.94 | 21.62 |
| Drakeol 600 | 11.48 | 11.17 | 13.29 | 13.6 | 12.28 |
| Blendex 820 | 26.41 | 25.7 | 27.65 | 28.29 | 25.55 |
| Formolene 5144L | 11.48 | 11.17 | 10.1 | 10.34 | 9.334 |
| Plastolyn R1140 | 11.48 | 11.17 | 10.63 | 10.88 | 9.826 |
| Black CPH-294 | 0 | 0 | 1.063 | 1.088 | 0.983 |
| Clariant OP 935 | 8.726 | 10.28 | 8.72 | 7.398 | 0 |
| JLS-PNA | 4.363 | 5.139 | 4.36 | 3.699 | 0 |
| JLS-APP | 0 | 0 | 0 | 0 | 13.76 |
| FP-2100J | 0 | 0 | 0 | 0 | 5.895 |
| Irganox 1010 | 0.149 | 0.145 | 0.138 | 0.141 | 0.138 |
| Irgafos 168 | 0.149 | 0.145 | 0.138 | 0.141 | 0.138 |
| Naugard 445 | 0.195 | 0.201 | 0.202 | 0.196 | 0.197 |

TABLE 3-continued

| Ingredient (Wt. %) | 1 | 2 | 3 | 4 | 5 |
|---|---|---|---|---|---|
| Irganox MD 1024 | 0.253 | 0.246 | 0.255 | 0.25 | 0.246 |
| Dynamar FT 5911 | 0.052 | 0.05 | 0.048 | 0.049 | 0.044 |

Table 4 shows the mechanical test results of compounds made from Examples 1-5 in the form of extruded film of 0.38-0.51 mm nominal thickness, except for Shore A hardness which was tested using a injected molded 3.0 mm thick plaque. The film provided a good preliminary test for physical properties of the compounds as insulation or jacketing layers.

TABLE 4

| Test | 1 | 2 | 3 | 4 | 5 |
|---|---|---|---|---|---|
| Shore A Hardness (ASTM D2240) | 85 | 85 | 85 | 83 | 86 |
| Specific Gravity (g/cm$^3$) | 1.008 | 1.016 | 0.999 | 0.991 | 1.065 |
| Tensile Strength (psi) (ASTM D882) | 2900 | 2700 | 2900 | 3000 | 2600 |
| Elongation (%) (ASTM D882) | 250 | 240 | 250 | 240 | 250 |
| 121° C./7 Day Aging | | | | | |
| % Tensile Strength Retention (UL 62) | 107 | 104 | 107 | 107 | 103 |
| % Elongation Retention (UL 62) | 92 | 96 | 92 | 96 | 88 |
| 136° C./7 Day Aging | | | | | |
| % Tensile Strength Retention (UL 62) | 107 | 104 | 107 | — | — |
| % Elongation Retention (UL 62) | 92 | 96 | 92 | — | — |

Tables 5-12 show the compliance of Examples 6-11 (Examples 1-3 made into cable insulation or jacketing) passing the safety standards of UL 62 using the test methods found in UL 1581.

Examples 6 and 7 were Examples 1 and 2 pellets, respectively, extruded into an insulation layer on a standard cable extruder operating at a speed of 200 meters per minute and with barrel temperature set at 200° C. to make an insulation wire as specified by the UL 62 test for 18AWG cable. Insulation is regarded as the more difficult test to pass, as compared with jacketing. Therefore, only insulation was performed.

Example 8 was the combination of Example 2 pellets extruded into an insulation layer and Example 3 pellets extruded as a jacketing layer, both on a standard cable extruder operating at a speed of 200 meters per minute and with barrel temperature set at 200° C. to make an insulation wire as specified by the UL 62 test for SVE 90C18AWG/3C cable.

In the Tables, "I" means Insulation, and "J" means Jacketing.

TABLE 5

UL 62 and UL 1581 Tests
Safety Standard

| | Before Aging (Minimum) | | Air Oven After Aging | | | |
|---|---|---|---|---|---|---|
| | | | | | % Retention of Before Aging Value (Minimum) | |
| Temperature | Elongation (%) | Tensile Strength (MPa) | Oven Temp. | Duration | Elongation | Tensile Strength |
| 105° C. | 200% | 5.52 for I and 8.31 for J | 136° C. | 168 | 75% | 75% |

Test Data
Before Aging

| Example | Specific Gravity (g/cm$^3$) | Section Area (mm$^2$) | Elongation (%) (Average of 4 for 6 and 7; Average of 5 for 8) | Force at Break (kg) (Average of 4) | Tensile Strength (MPa) | Pass/Fail |
|---|---|---|---|---|---|---|
| 6 I | 1.008 | 5.200 | 271 | 8.667 | 16.38 | Pass |
| 7 I | 1.008 | 5.200 | 271 | 8.693 | 16.38 | Pass |
| 8 I | — | — | 264 | — | 18.27 | Pass |
| 8 J | — | — | 246 | — | 15.62 | Pass |

TABLE 6

US 62 and UL 1581 Tests
After Aging
(Examples 6 and 7 used 136° C. and 168 hours; Example 8 used 121° C. and 168 hours)

| Example | Specific Gravity (g/cm$^3$) | Section Area (mm$^2$) | Elongation (%) (Average of 5) | Force at Break (kg) (Average of 5) | Tensile Strength (MPa) | % Retention of Before Aging Value: Elongation | % Retention of Before Aging Value: Tensile Strength | Pass/Fail |
|---|---|---|---|---|---|---|---|---|
| 6 I | 1.008 | 5.200 | 227 | 8.614 | 15.98 | 84% | 99% | Pass |
| 7 I | 1.008 | 5.200 | 216 | 8.293 | 15.59 | 80% | 95% | Pass |
| 8 I | — | — | 227 | — | 19.59 | 86% | 107% | Pass |
| 8 J | — | — | 188 | — | 14.98 | 76% | 96% | Pass |

TABLE 7

| UL 62 and UL 1581 Tests VW-1 Flame Test (secs.) | 1 | 2 | 3 | 4 | 5 | Pass/Fail |
|---|---|---|---|---|---|---|
| 6 I a | 42.3 | 9.1 | 0.5 | 0.3 | 0.4 | Pass |
| 6 I b | 38.4 | 12.1 | 0.9 | 0.2 | 0.3 | Pass |
| 6 I c | 41.3 | 2.8 | 0.6 | 0.5 | 0.3 | Pass |
| 7 I a | 35.1 | 3.4 | 0.9 | 0.5 | 0.4 | Pass |
| 7 I b | 30.6 | 8 | 0.3 | 0.4 | 0.5 | Pass |
| 7 I c | 40.6 | 4.9 | 0.5 | 0.7 | 0.6 | Pass |
| 8 I a | 16 | 3 | 0 | 0 | 0 | Pass |
| 8 I b | 15 | 1 | 0 | 0 | 0 | Pass |
| 8 I c | 15 | 2 | 0 | 0 | 0 | Pass |
| 8 I d | 17 | 4 | 0 | 0 | 0 | Pass |
| 8 I e | 16 | 3 | 0 | 0 | 0 | Pass |
| 8 J a | 1 | 2 | 4 | 14 | 6 | Pass |
| 8 J b | 1 | 10 | 2 | 7 | 17 | Pass |
| 8 J c | 0 | 15 | 7 | 17 | 14 | Pass |
| 8 J d | 0 | 14 | 9 | 19 | 6 | Pass |
| 8 J e | 0 | 12 | 8 | 12 | 5 | Pass |

TABLE 8

| UL 62 and UL 1581 Tests Cold Bend Test | Results | Pass/Fail |
|---|---|---|
| Safety Standard: No Cracks After Treatment at a Temperature of −40° C. ± 2° C. for 6 Hours Using a Mandrel of a Diameter of 12 mm and having 6 Spiral Turns | | |
| 6 I a | No Cracks | Pass |
| 6 I b | No Cracks | Pass |
| 6 I c | No Cracks | Pass |
| 7 I a | No Cracks | Pass |
| 7 I b | No Cracks | Pass |
| 7 I c | No Cracks | Pass |
| Safety Standard: No Cracks After Treatment at a Temperature of −20° C. ± 2° C. for 4 Hours Using a Mandrel of a Diameter of 6.5 mm for I and of 19 mm for J | | |
| 8 I a | No Cracks | Pass |
| 8 I b | No Cracks | Pass |
| 8 I c | No Cracks | Pass |
| 9 J a | No Cracks | Pass |
| 8 J b | No Cracks | Pass |
| 8 J c | No Cracks | Pass |

TABLE 9

| UL 62 and UL 1581 Tests Hot Water Insulation Resistance Test (70° C. for 48 Hours and 1000 Volts) | | |
|---|---|---|
| Safety Standard: >0.011 MΩkm | Results | Pass/Fail |
| 6a | Over Limit | Pass |
| 6b | Over Limit | Pass |
| 6c | — | — |
| 7a | Over Limit | Pass |
| 7b | Over Limit | Pass |
| 7c | Over Limit | Pass |
| Water Insulation Resistance Test (25° C. for 0.5 Hours) | | |
| Safety Standard: >0.76 GΩ/m | Results | Pass/Fail |
| 8 I a | 1737 GΩ/m | Pass |
| 8 I b | 2073 GΩ/m | Pass |
| 8 I c | 2164 GΩ/m | Pass |

TABLE 10

| UL 62 and UL 1581 Tests Deformation Test (150° C for 1 Hour) | | |
|---|---|---|
| Safety Standard: 300 g (18AWG Wire) and a Deformation of <50% | Thermal Deformation (%) | Pass/Fail |
| 6a | 42.5 | Pass |
| 7a | 38.4 | Pass |
| 8 I a | 35.2* | Pass |
| 8 I b | 35.6* | Pass |
| 8 I c | 37.1* | Pass |
| 8 J a | 17.9 | Pass |
| 8 J b | 19.2 | Pass |
| 8 J c | 21.3 | Pass |

*Using the copper rod test method after the first test using the twist wire test method resulted in 53.3%, 52.9%, and 52.7% Thermal Deformation Rates, respectively.

TABLE 11

| Immersed Water Test* (70° C. for 168 Hours) | | | | | | |
|---|---|---|---|---|---|---|
| | Elongation | Force at Break | Tensile | % Retention of Before Aging Value | | Pass |
| Example | (%) Average of 5 | (kg) | Strength (kg/mm$^2$) | Elongation | Tensile Strength | or Fail |
| 6 | 255 | 8.903 | 1.71 | 94% | 103% | Pass |

*Immersed water test is required by the European Union.

TABLE 12

| UL 62 and UL 1581 Tests Hot Shock Test Safety Standard: No Cracks After Treatment at a Temperature of 150° C. for 1 Hour | Results | Pass/Fail |
|---|---|---|
| 6 I a | No Cracks | Pass |
| 6 I b | No Cracks | Pass |
| 6 I c | No Cracks | Pass |
| 7 I a | No Cracks | Pass |
| 7 I b | No Cracks | Pass |
| 7 I c | No Cracks | Pass |
| 8 I a | No Cracks | Pass |
| 8 I b | No Cracks | Pass |
| 8 I c | No Cracks | Pass |
| 8 J a | No Cracks | Pass |
| 8 J b | No Cracks | Pass |
| 8 J c | No Cracks | Pass |

Three samples each of Examples 6, 7, and 8 also passed the Di-Electric Strength test of UL 62 and UL 1581 after testing in air at 1.5 kV for one minute.

From a review of Tables 5-12 and the preceding paragraph, it is seen that Examples 1 and 2, designed for insulation, and Example 3, designed for jacketing, and formed into those layers as Examples 6-8 pass the difficult UL 62 tests using the methods of testing outlined in UL 1581. This is believed to be the first time a PPE-rich TPE has passed the UL 62 safety standard, a breakthrough of a long-felt need in the wire and cable industry.

Examples 9-33

Tables 13-19 show the formulations and physical property test results for Examples 9-33. All Examples 9-33 were made in the same manner as Examples 1-3 and molded in the same manner as Examples 1-3 tested as plaques for Shore A hardness and as films for the other physical properties.

Examples 9-30 were tested to determine the variations possible for the TPE without the presence of non-halogenated flame retardant. The goal of Examples 9-30 was to maximize physical properties of the TPE, especially elongation retention percentage after aging, because the addition of flame retardant(s) to the compound would likely reduce that percentage retention. Tables 13-18 therefore show testing of parameters of the base TPE compound without flame retardant present and are designed to assist the person having ordinary skill in the art to guide the construction many different formulations of TPEs of the present invention without undue experimentation.

Examples 31-33 were formulations with non-halogenated flame retardant which benefitted from the studies of Examples 9-30 with results as seen in Tables 13-18. Table 19 shows the testing of Examples 30-33 for the all-important UL V-0 flame test useful in many different end uses for thermoplastic elastomers.

Table 13 shows the effects of a variety of oil loadings on thermal aging elongation retention for the TPE without flame retardant present. If solid flame retardant were to be added to these formulations, it is possible that only Example 12 would pass the after-aging elongation retention test of UL-62 for protected electrical lines. However, the formulations could be useful for other TPE-based plastic articles needing the strength of PPE and the flame retardance of solid flame retardants.

TABLE 13

Effect of Oil without Tackifier or Flame Retardant

| Ingredients (Wt. %) | 9 | 10 | 11 | 12 |
|---|---|---|---|---|
| Kraton G1650 | 24.92% | 28.10% | 30.43% | 32.21% |
| Drakeol 600 | 22.65% | 19.16% | 27.66% | 14.64% |
| Blendex HPP820 | 29.45% | 33.21% | 27.66% | 38.07% |
| Formolene 5144L | 22.65% | 19.16% | 13.83% | 14.64% |
| Irganox 1010 | 0.34% | 0.38% | 0.41% | 0.44% |
| Hardness, A | 86 | 87 | 74 | 88 |
| Tensile, psi | 2500 | 3100 | 2700 | 3400 |
| Elongation, % | 270 | 270 | 290 | 230 |
| 136° C./168 h Aging | | | | |
| T/S retention, % | 104% | 100% | 89% | 111% |
| Elongation retention, % | 78% | 81% | 76% | 87% |

Table 14 shows the effects of variation of polypropylene on TPE hardness and thermal aging elongation retention without flame retardant present. Example 13 is preferred over Example 14 for most end uses because the former is softer and better after-aging elongation retention. However, some skilled in the art might prefer Example 14 for use as injection molded TPE-based plastic articles.

TABLE 14

Effect of Polypropylene without Flame Retardant

| Ingredients (Wt. %) | 13 | 14 |
|---|---|---|
| Kraton G1650 | 29.22% | 27.74% |
| Drakeol 600 | 13.28% | 12.61% |
| Blendex HPP820 | 30.54% | 29.00% |
| Formolene 5144L | 13.28% | 17.65% |
| Plastolyn R1140 | 13.28% | 12.61% |
| Irganox 1010 | 0.40% | 0.38% |
| Hardness, A | 83 | 89 |
| Tensile, psi | 3800 | 3700 |
| Elongation, % | 280 | 310 |
| 136° C./168 h aging | | |
| T/S retention, % | 95% | 95% |
| Elongation retention, % | 96% | 81% |

Table 15 shows the effects of various concentrations of tackifier without flame retardant present, emphasizing that more than 7.5 weight percent of tackifier assists the modification of mid-block olefin moieties of the hydrogenated styrene block copolymer for those formulations which use an hydrogenated SBC requiring plasticizing oil. No film could be made with Example 15, and only bad film could be made with Example 16. These results predict that no practical extrusion as insulation or jacketing would be possible, although injection molding might be possible. Therefore, Examples 15 and 16 are unsatisfactory for protected electrical lines without tackifier present. Example 17 is the same formulation as Example 13, and both Examples 13 and 17 employ the same base compound as that used in Examples 1 and 2 above.

TABLE 15

Effect of Tackifier without Flame Retardant

| Ingredients (Wt. %) | 15 | 16 | 17 |
|---|---|---|---|
| Kraton G1650 | 33.69% | 31.29% | 29.22% |
| Drakeol 600 | 15.31% | 14.22% | 13.28% |
| Blendex HPP820 | 35.22% | 32.72% | 30.54% |
| Formolene 5144L | 15.31% | 14.22% | 13.28% |
| Plastolyn R1140 | 0.00% | 7.11% | 13.28% |
| Irganox 1010 | 0.46% | 0.43% | 0.40% |
| Hardness, A | No Film | Bad Film | 83 |
| Tensile, psi | No Film | Bad Film | 3800 |
| Elongation, % | No Film | Bad Film | 280 |
| 136° C./168 h aging | | | |
| T/S retention, % | No Film | Bad Film | 95% |
| Elongation retention, % | No Film | Bad Film | 96% |

Table 16 shows the effects of the amount of PPE used without flame retardant present, emphasizing that less than about 38 weight percent is preferred for those formulations. Also after addition of solid flame retardant, the TPE compound of Example 18 would be expected to extrude only at a slower rate than the rates (>200 m/min.) for either Example 19 or Example 20. Example 20 was the same base TPE compound without flame retardant as Example 3 above. There might be some injection molded plastic articles which actually prefer a rough surface.

TABLE 16

Effect of PPE Amount without Flame Retardant

| Ingredients (Wt. %) | 18 | 19 | 20 |
|---|---|---|---|
| Kraton G1650 | 25.49% | 27.06% | 28.10% |
| Drakeol 600 | 11.59% | 12.30% | 12.77% |

TABLE 16-continued

| Effect of PPE Amount without Flame Retardant | | | |
|---|---|---|---|
| Ingredients (Wt. %) | 18 | 19 | 20 |
| Blendex HPP820 | 39.40% | 35.67% | 33.21% |
| Formolene 5144L | 11.59% | 12.30% | 12.77% |
| Plastolyn R1140 | 11.59% | 12.30% | 12.77% |
| Irganox 1010 | 0.35% | 0.37% | 0.38% |
| Surface Texture | Rough | Smooth | Smooth |

Table 17 shows the use of a variety of hydrogenated thermoplastic elastomers, without flame retardant present. The inability to make film was not fatal to the possibility of using Kraton G1654H in the TPE compound of the invention. Example 21 was the base compound, without flame retardant, of Example 3 above which has proven to pass UL 62 as a jacketing layer in Example 8 and will likely process very rapidly and well. It is expected that Example 26 using SEEPS will work as well as Example 21 using SEBS. However, Example 27 showed difficult film formation, probably due to the higher molecular weight of Kraton G1654 SEBS than the molecular weight of Kraton G1650 SEBS. Moreover, Examples 22-25, while passing after-aging percentage elongation retention barely, would not be expected to pass that test after the introduction of solid flame retardant. Nonetheless, Examples 22-25 might have usefulness for injection molded plastic articles where after-aging percentage elongation retention of >75% is not required.

TABLE 17

| Effect of TPE Used without Flame Retardant | | | | | | | |
|---|---|---|---|---|---|---|---|
| Ingredients (Wt. %) | 21 | 22 | 23 | 24 | 25 | 26 | 27 |
| Kraton G1650 | 28.10% | 0.00% | 0.00% | 12.77% | 6.39% | 0.00% | 0.00% |
| Kraton G1652 | 0.00% | 28.10% | 0.00% | 0.00% | 0.00% | 0.00% | 0.00% |
| Kraton 1642 | 0.00% | 0.00% | 28.10% | 0.00% | 0.00% | 0.00% | 0.00% |
| Septon 4033 | 0.00% | 0.00% | 0.00% | 0.00% | 0.00% | 28.10% | 0.00% |
| Kuraray Q1250 | 0.00% | 0.00% | 0.00% | 15.33% | 21.71% | 0.00% | 0.00% |
| Kraton G1654H | 0.00% | 0.00% | 0.00% | 0.00% | 0.00% | 0.00% | 28.10% |
| Drakeol 600 | 12.77% | 12.77% | 12.77% | 12.77% | 12.77% | 12.77% | 12.77% |
| Blendex HPP820 | 33.21% | 33.21% | 33.21% | 33.21% | 33.21% | 33.21% | 33.21% |
| Formolene 5144L | 12.77% | 12.77% | 12.77% | 12.77% | 12.77% | 12.77% | 12.77% |
| Plastolyn R1140 | 12.77% | 12.77% | 12.77% | 12.77% | 12.77% | 12.77% | 12.77% |
| Irganox 1010 | 0.38% | 0.38% | 0.38% | 0.38% | 0.38% | 0.38% | 0.38% |
| | | | | | | | No Film |
| Tensile, psi | 3400 | 2700 | 2400 | 2700 | 1900 | 3300 | |
| Elongation, % | 270 | 240 | 330 | 270 | 230 | 270 | |
| 136° C./168 h aging | | | | | | | |
| T/S retention, % | 94% | 100% | 75% | 89% | 84% | 92% | |
| Elongation retention, % | 89% | 75% | 79% | 78% | 70% | 88% | |

Table 18 shows the effects of varying the type of thermoplastic elastomer including those grades which are intended to be used without the presence of oil. Example 28 offers the comparison of an oil and mid-block modifier formulation against Examples 29 and 30 which do not. The amount of oil is replaced by thermoplastic elastomer. The amount of mid-block modifier is replaced by polypropylene.

TABLE 18

| Effect of TPE Used without Flame Retardant | | | |
|---|---|---|---|
| Ingredients (Wt. %) | 28 | 29 | 30 |
| Kraton G1650 | 29.22% | 0.00% | 0.00% |
| Kraton MD6945 | 0.00% | 42.50% | 0.00% |
| Kraton G1643 | 0.00% | 0.00% | 42.50% |
| Drakeol 600 | 13.28% | 0.00% | 0.00% |
| Blendex HPP820 | 30.54% | 30.54% | 30.54% |
| Formolene 5144L | 13.28% | 26.56% | 26.56% |
| Plastolyn R1140 | 13.28% | 0.00% | 0.00% |
| Irganox 1010 | 0.40% | 0.40% | 0.40% |
| Hardness, A | 83 | 91 | 89 |
| Tensile, psi | 3800 | 2400 | 1900 |
| Elongation, % | 280 | 430 | 360 |
| Viscosity @ 200° C., Pa-s | | | |
| 223/s | 386 | 794 | 708 |
| 67/s | 954 | 1984 | 1524 |
| 136° C./168 h aging | | | |
| T/S retention, % | 95% | 100% | 100% |
| Elongation retention, % | 96% | 86% | 81% |

Table 19 shows formulations of the invention also passed the UL V-0 flame retardancy test. Examples 31-33 all included organo-phosphinate as a synergist for either melamine polyphosphate, polyammonium polyphosphate, or the proprietary Amfine FP-2100J nitrogen-phosphorous based flame retardant product.

TABLE 19

| Test for V-0 Performance with Flame Retardant | | | |
|---|---|---|---|
| Ingredients (Wt. %) | 31 | 32 | 33 |
| Kraton G1650 | 23.84% | 23.84% | 23.84% |
| Drakeol 600 | 10.83% | 10.83% | 10.83% |
| Blendex HPP820 | 28.17% | 28.17% | 28.17% |
| Formolene 5144L | 10.83% | 10.83% | 10.83% |
| Plastolyn R1140 | 10.83% | 10.83% | 10.83% |
| Exolit OP 935 | 7.58% | 7.58% | 7.58% |
| JLS PNA | 7.58% | 0.00% | 0.00% |
| JLS-APP | 0.00% | 7.58% | 0.00% |
| FP-2100J | 0.00% | 0.00% | 7.58% |

TABLE 19-continued

| Test for V-0 Performance with Flame Retardant | | | |
|---|---|---|---|
| Ingredients (Wt. %) | 31 | 32 | 33 |
| Irganox 1010 | 0.33% | 0.33% | 0.33% |
| UL-94 V0 @ 3.00 mm thickness | Pass | Pass | Pass |

Without undue experimentation, a person having ordinary skill in the art can utilize Examples 1-33 to make insulation or jacketing for protected electrical line (wire, cable, or both) which can pass the UL 62 test. Also, these Examples inform the art of these compounds being suitable for injected molded TPE-based plastic articles which need flame retardance.

The invention is not limited to the above embodiments. The claims follow.

What is claimed is:

1. A thermoplastic elastomer compound, consisting of:

(a) from about 20 to about 35 weight percent of a polyphenylene ether, based on the total weight of the compound, wherein the polyphenylene ether is unblended or blended with an aromatic vinyl group thermoplastic resin;

(b) from about 20 to about 40 weight percent of a hydrogenated styrenic block copolymer, based on the total weight of the compound;

(c) from about 5 to about 30 weight percent of a combination of organo-phosphinate and melamine polyphosphate, based on the total weight of the compound;

(d) from about 5 to about 30 weight percent of a nucleated olefinic polymer, based on the total weight of the compound;

(e) from about 5 to about 30 weight percent of a plasticizing oil, based on the total weight of the compound;

(f) from about 5 to about 25 weight percent of a tackifier, based on the total weight of the compound; and (g) optionally, from 0 to about 5 weight percent of at least one additive, based on the total weight of the compound, wherein the additive is selected from the group consisting of antioxidants; pigments, colorants or dyes; stabilizers; and ultraviolet light absorbers;

wherein the compound has a before-aging tensile elongation of >200% and an after-aging tensile elongation residual of at least 75%, according to Underwriters' Laboratory test UL 62; and wherein the compound has a V-0 rating at 3 mm thickness, according to Underwriters' Laboratory test UL 94.

2. The compound of claim 1, wherein the hydrogenated styrenic block copolymer has a weight average molecular weight of between about 70,000 and about 160,000 and a ratio of styrenic end-block to olefinic mid-block ranging from about 20/80 to about 40/60.

3. The compound of claim 1, wherein the hydrogenated styrenic block copolymer is selected from the group consisting of styrene-ethylene butylene-styrene polymers, styrene-ethylene propylene-styrene polymers, hydrogenated styrene-isoprene block copolymers, and hydrogenated styrene-butadiene block copolymers, styrene-ethylene-ethylene-propylene-styrene copolymers, and combinations of them.

4. The compound of claim 1, wherein the polyphenylene ether is selected from the group consisting of poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dimethoxy-1,4-phenylene ether), poly(2,6-di(chloro methyl)-1,4-phenylene ether), poly(2,6-di(bromo methyl)-1,4-phenylene ether), poly(2,6-diphenyl-1,4-phenylene ether), poly(2,6-ditoluyl-1,4-phenylene ether), poly(2,6-dichloro-1,4-phenylene ether), poly(2,6-dibenzyl-1,4-phenylene ether), poly(2,5-dimethyl-1,4-phenylene ether), and combinations thereof.

5. The compound of claim 4, wherein the aromatic vinyl group thermoplastic resin is selected from the group consisting of homopolymers of styrene or its derivatives, copolymers of styrene and p-methyl styrene, copolymers of styrene and alpha-methyl styrene, copolymers of styrene and alpha-methyl-p-methyl styrene, copolymers of styrene and chlorostyrene, copolymers of styrene and bromostyrene, and combinations thereof.

6. The compound of claim 1, wherein the nucleated olefinic polymer is nucleated polypropylene homopolymer.

7. The compound of claim 1 in the form of an insulation layer enveloping a protected electrical line or in the form of a jacketing layer enveloping a protected electrical line.

8. A plastic article made from a compound of claim 1.

9. The plastic article of claim 8, in the form of an electrical part or an electronic part.

10. A protected electrical line, comprising:

(a) wire or cable having an axial length and (b) at least one layer of the compound of claim 1 enveloping the axial length of the wire or cable.

11. The protected electrical line of claim 10 in the form of a wire.

12. The protected electrical line of claim 10 in the form of a cable.

* * * * *